United States Patent

[11] 3,577,597

[72] Inventors Donald A. Draudt
27180 Pompton Drive;
Herbert T. Draudt, 28520 Lynhaven,
North Olmsted, Ohio 44070
[21] Appl. No. 761,095
[22] Filed Sept. 20, 1968
[45] Patented May 4, 1971
Continuation-in-part of application Ser. No.
551,386, May 19, 1966, now Patent No.
3,406,429.

[54] SUPPORT FOR INJECTION-MOLDING MACHINE
4 Claims, 7 Drawing Figs.
[52] U.S. Cl. .................................................... 18/30,
18/12
[51] Int. Cl. .................................................... B29f 1/00

[50] Field of Search ............................................ 18/30 (I),
30 (NEF), 30 (NFM), 12 (DH), 12 (SV)

[56] References Cited
UNITED STATES PATENTS
2,274,800  3/1943  Lester ........................(18/30NEM)UX
2,530,262  11/1950  Nelson ........................ (18/12DH)UX

*Primary Examiner*—H. A. Kilby, Jr.
*Attorney*—Bosworth, Sessions, Herrstrom and Cain

ABSTRACT: Apparatus for molding articles from thermoplastics wherein the moldable plastic material is plasticized and injected into a mold cavity. The plasticizing and injecting unit is pivotally mounted in a frame fixed relative to the mold and the unit may be released at one end of the frame and swung away from the mold to facilitate cleaning.

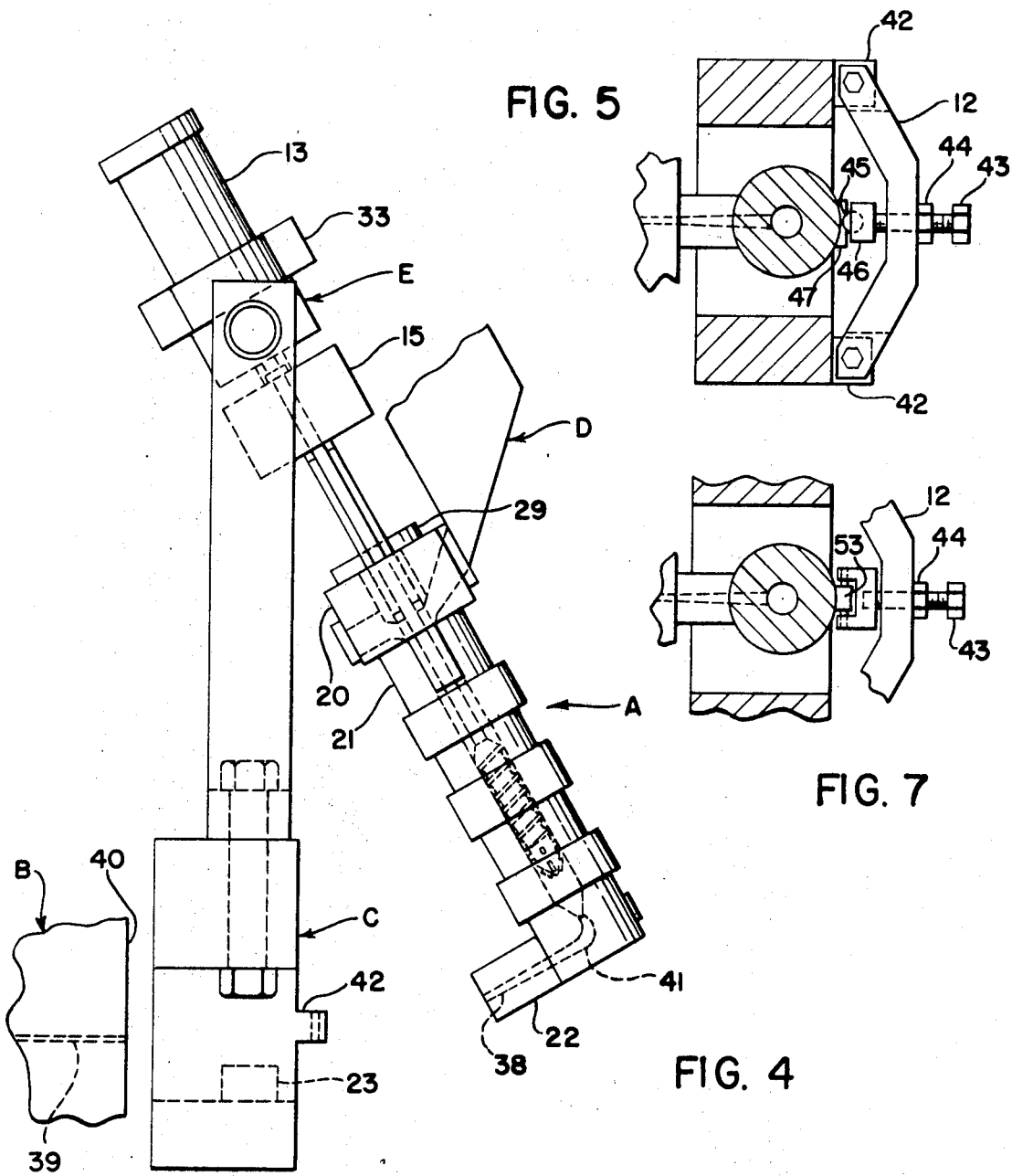

3,577,597

SUPPORT FOR INJECTION-MOLDING MACHINE

CROSS REFERENCE TO RELATED APPLICATIONS

This application is a continuation-in-part of our copending application Ser. No. 551,386 now U.S. Pat. No. 3,406,429 filed May 19, 1966.

BACKGROUND OF THE INVENTION

Our invention relates to injection molding and more particularly to an improved means for mounting a plasticizing cylinder and injection nozzle in operating relation to a mold so as to facilitate cleaning of the nozzle.

Injection-molding processes are used to form many types of plastic material especially thermoplastics such as nylon, polyethylene, vinyl, styrene, polyurethane, "delrin" and acetate.

Where thermoplastics are used the equipment can be cycled as fast as the material can be heated and plasticized in the cylinder and a measured charge thereof positioned for injection. Fast cycling is particularly desirable in order to avoid overheating and charring, or heating of portions or zones of material for an excessive period of time sufficient to cause decomposition. Methods for obtaining this result however have not been satisfactory in the prior art practices for several reasons.

In many cases rapid cycling of the injection-molding equipment fails to achieve complete and homogeneous mixing of the plastic material prior to injection so that the injection mechanism does not remove all of the material in the charging end or forward end of the cylinder during the molding cycle. As a result residual material may remain in the cylinder in a heated condition for a time period that may exceed its physical limits and it becomes charred or in some cases decomposed. As a result frequent cleaning of the cylinder bore and nozzle is required.

According to prior art practices the cleaning of the nozzle and cylinder bore required partial disassembly of the machine. This is a laborious procedure and requires shutting down the equipment for a considerable period of time. Following partial disassembly a cleaning material is run through the cylinder for a few cycles to clean the working surfaces, after which the machine is reassembled.

The apparatus of the present invention reduces the difficulties indicated above and affords other features and advantages not obtainable from the prior art.

SUMMARY OF THE INVENTION

It is among the objects of our invention to facilitate the cleaning of the plasticizing cylinder and injection nozzle of an injection-molding machine.

Another object is to simplify the installation of and cleaning of an injection-molding apparatus of the type disclosed in our copending application, Ser. No. 551,386 now U.S. Pat. No. 3,406,429.

These and other objects are accomplished by means of an injection-molding apparatus comprising a frame and a mold in fixed position relative to the frame. The mold block has a face with a sprue formed therein to provide a passage to the molding cavity. A plasticizing cylinder and injection nozzle with other associated equipment are mounted in the frame as a unit for pivotal movement about an axis parallel to the sprue face of the mold. The unit has a nozzle spaced from the axis and adapted to swing with the unit between an operating position in engagement with the sprue face and a pivotally displaced position spaced away from the sprue face. Also means are provided for fastening the unit to the frame in its operating position.

Other objects, uses and advantages of the invention will be apparent from the following detailed description and drawings.

BRIEF DESCRIPTION OF THE DRAWINGS

FIG. 4 is a side elevational view similar to FIGS. 2 and 3 but with the nozzle end of the injection unit released and pivoted away from the frame;

FIG. 5 is a horizontal section taken on the line 5—5 of FIG. 3;

FIG. 6 is another horizontal section similar to FIG. 5, showing an alternate means for securing the lower end of the plasticizing cylinder in position relative to the mold; and FIG. 7 is still another horizontal section similar to FIGS. 5 and 6, showing another alternate means for securing the lower end of the plasticizing cylinder in position relative to the mold.

DESCRIPTION OF THE PREFERRED EMBODIMENT

Figure 2:
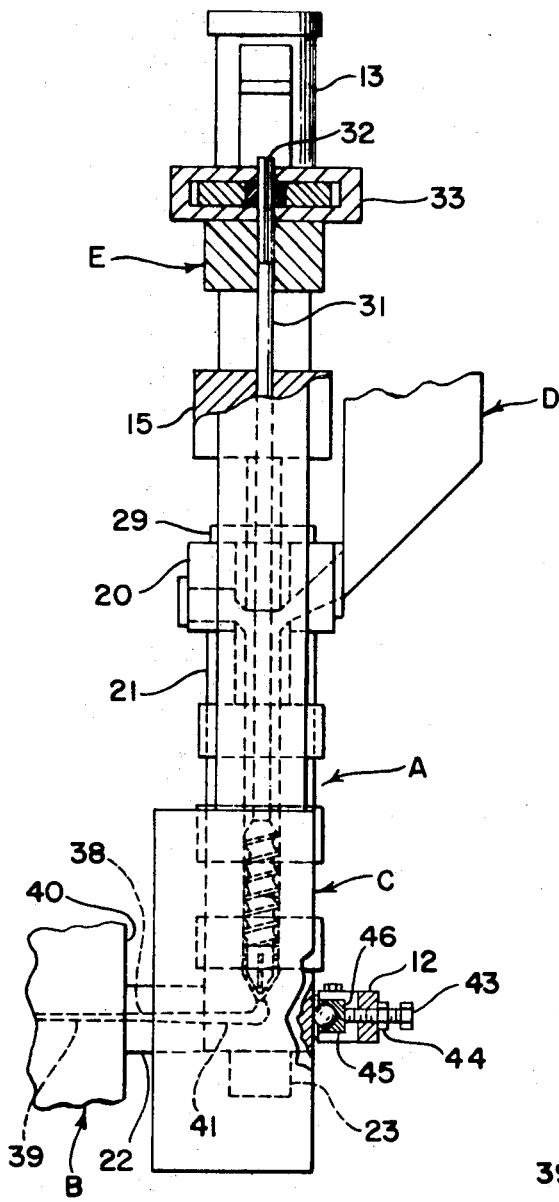
FIG. 2 is a side elevation of the apparatus of FIG. 1 with parts broken away and shown in section, the injection unit being shown with the nozzle in its operating position.
Figure 3:
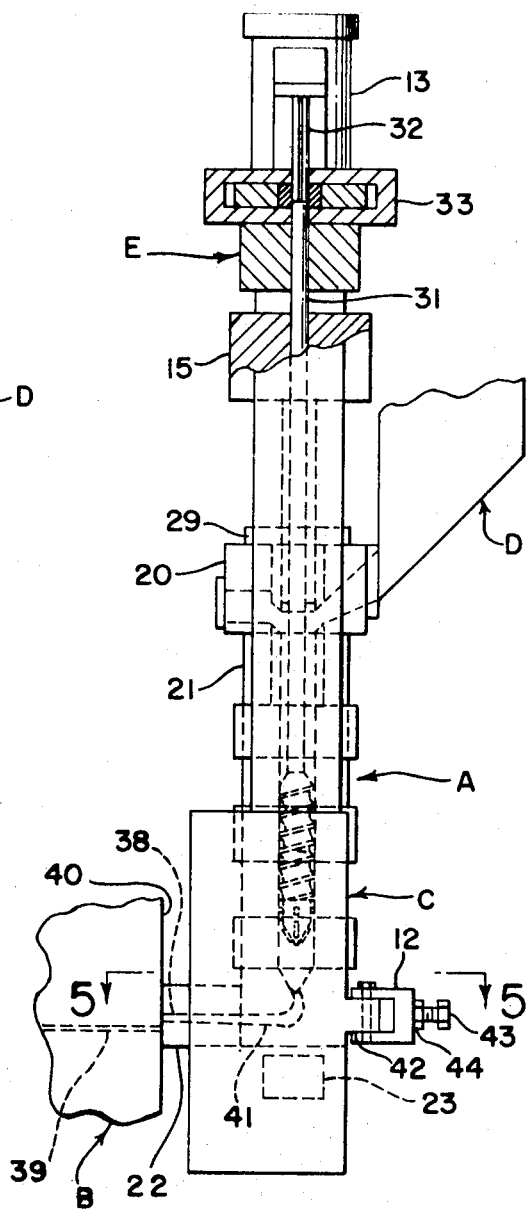
FIG. 3 is a side elevation similar to FIG. 2, showing the plunger carrier plate in its uppermost position and the rotary member in its most rearward position preparatory to an injection stroke.

Referring more particularly to the drawings there is shown a plasticizing and injecting unit A adapted for use in connection with a closed die mold B as shown in FIGS. 2 and 3. The unit A is mounted in a frame C and includes a feed hopper D and a crosshead E. The crosshead E supports the unit A and has trunnions 10 provided at its opposite ends which are journaled in bearings 11 mounted in the frame C. Thus the crosshead E and the unit A are capable of pivotal movement relative to the frame C in accordance with the invention.

Figure 1:
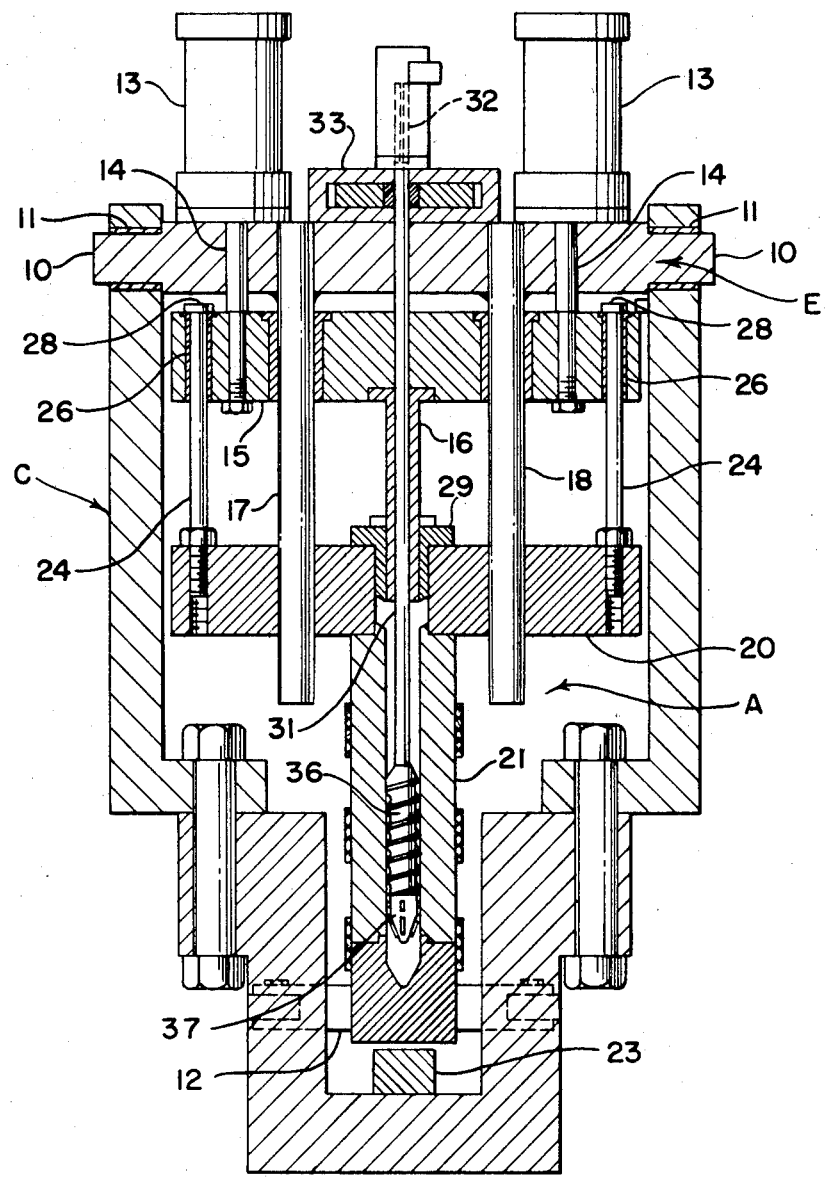
FIG. 1 is a sectional view taken through the center of an injection-molding apparatus embodying the invention.

FIGS. 1, 2, and 3 show the unit A secured to the frame C in operating position by a yoke 12 whereas FIG. 4 shows the unit A pivoted about the axis of the crosshead E away from the mold B to facilitate cleaning of the plasticizing cylinder and nozzle as will be described below.

Mounted on the crosshead E are two hydraulic cylinders 13 having piston rods 14 extending downwardly through the crosshead E. Connected to the piston rods 14 is a plunger carrier plate 15 which carries a tubular injection plunger 16. The plunger carrier plate 15 is guided for reciprocating movement by guide rods 17 which are mounted in fixed position on the crosshead E.

Mounted below the plunger carrier plate 15 is a cylinder plate 20 which is guided for reciprocating movement on the guide rods 17 and which supports a plasticizing cylinder 21 having an injection nozzle 22 at its lower end. The cylinder carrier plate 20 moves the plasticizing cylinder 21 and the injection nozzle 22 between the position shown in FIG. 2 wherein the bottom of the cylinder 21 rests on a block 23 mounted at the bottom of the frame C, and a position wherein the cylinder 21 and injection nozzle 22 are lifted upward to bring the nozzle 22 out of communication with the sprue of the mold B as will be more particularly described below.

Axial movement of the plasticizing cylinder 21 is accomplished by means of lifter rods 24 mounted at opposite ends of the cylinder carrier plate 20. The lifter rods 24 extend upwardly from the cylinder carrier plate 20 through bushings 26 located in the plunger carrier plate 15. The upper ends of the lifter rods 24 have a radial flange 28 which overlies the top surface of the plunger carrier plate 15 so that during the terminal portion of the upward movement of the plunger carrier plate 15, the lifter rods 26 are pulled upwardly to raise the cylinder plate 20 together with plasticizing cylinder 21.

Mounted on the cylinder carrier plate 20 above the plasticizing cylinder 21 is a guide bushing 29 which receives the tubular injection plunger 16 and guides its reciprocating movement. The bushing 29 also serves to close the upper end of the plasticizing cylinder 21.

Mounted for free axial movement within the plasticizing cylinder 21 is a rotary member having a shaft 31 which extends upwardly from the plasticizing cylinder 21 through the tubular injection plunger 16 and through the plunger carrier plate 15 and crosshead E. The outer end 32 of the shaft 31 is splined and is engaged by a rotary hydraulic drive unit 33. The spline outer end 32 is so designed that the rotary member 30 is capable of free axial movement during the operation of the rotary drive. Located at the lower end of the shaft 31 within the bore of the plasticizing cylinder 21 is a plasticizing screw 36 having a minor diameter which increases gradually from rear to front. At the lower end of the screw 36 is a mixing head 37.

The operation of the cylinder and plunger 16 is best described in our aforementioned copending applications and does not form a part of the present invention.

When the nozzle 22 is in the position shown in FIG. 2 the port 38 of the nozzle communicates with a sprue 39 located in the face 40 of the mold adjacent the nozzle (hereinafter called the sprue face). The nozzle port 38 communicates with the lower end of the cylinder bore by means of a passage 41 formed in the plasticizing cylinder 21 to permit plasticized material to flow from the bore to the nozzle 22 and thence into the mold cavity. The flow of plasticized material from the nozzle 22 to the mold B may be interrupted during the molding cycle by lifting the plasticizing cylinder 21 and nozzle 22 upward to the position shown in FIG. 3 using the hydraulic cylinder 13. In this position the mold block seals the nozzle port 38 and prevents escape of material.

Both the plasticizing cylinder 21 and the nozzle 22 are heated by an external electrical heating jacket during the operation of the equipment to provide desired plasticizing temperatures as is well known in the art.

Downward movement or injecting movement of the plasticizing screw 36 is accomplished by means of the tubular plunger 16 which at an appropriate time presses against the material at the upper end of the cylinder bore adjacent the inlet port and forces both the material and the screw 36 downwardly through the bore. This serves to force plasticized material located at the lower end of the bore outwardly through the passage 41 and the nozzle part 38 into the mold B.

The hydraulic cylinders 13 are actuated shortly thereafter to pull the plunger 16 upwardly out of the cylinder bore to the position shown in FIG. 3 shortly after the mixing head 37 bottoms. During the last portion of the upward movement of the plunger 16, the radial flanges 28 at the ends of the lifter rods 24 are engaged by the plunger carrier plate 15 to lift the plasticizing cylinder injection nozzle 22 out of communication with the mold sprue 39 and prevent the flow of material in either direction.

The lower end of the plasticizing cylinder 21 is secured to the frame C by the yoke 12 which is bolted to lugs 42 welded to opposite sides of the frame C (FIG. 5). A clamping bolt 42 is threaded through the yoke 12 and secured in place by a fastening nut 44. A ball bearing 45 carried in a socket 46 fastened to the inner end of the clamping bolt 43, bears against a bearing plate 47 welded to the bottom of the plasticizing cylinder 21 and serves to press the nozzle 22 tightly against the sprue face 40 of the mold B (FIG. 5). The ball bearing enables the plasticizing cylinder and nozzle to move up and down between the two positions shown in FIGS. 2 and 3 respectively while still maintaining the necessary pressure forcing the nozzle 22 against the sprue face 40.

FIGS. 6 and 7 show alternate arrangements for accommodating the axial movement of the plasticizing cylinder 21 and nozzle 22. In FIG. 6 a roller bearing 50 bears against a bearing plate 51 on the cylinder 21, the roller 50 being carried in a roller carrier 52. FIG. 7 shows a similar arrangement wherein a concave roller bearing 53 is used to avoid the need for a bearing plate, the bearing surface being formed to match the circumference of the plasticizing cylinder 21.

When the plasticizing cylinder 21 and nozzle 22 are to be cleaned the operation is stopped at a point in the cycle when the nozzle 22 is raised to the position shown in FIG. 3. To release the nozzle 22, plasticizing cylinder 21 and associated parts of the unit A, the bolts which secure the yoke 12 to the frame C are removed. Then the entire unit A which includes the nozzle 22 and plasticizing cylinder 21 may be pulled back to the position shown in FIG. 4 and held in position by inserting a spacing block between the frame and the outwardly pivoted unit. With the unit A in this position access is provided to the nozzle 22 and the machine may be cycled as often as desired to remove the plastic material remaining in the cylinder and nozzle and also to pass suitable cleaning fluid through a sufficient number of cycles to clean the working surfaces and remove all of the charred material.

When this is accomplished the spacer block may be removed and the unit A swung back to its operating position shown in FIG. 3. Then the yoke 12 is positioned and bolted to the lugs 42 and the clamping bolt 43 is tightened down so that the nozzle 22 is firmly held against the sprue face 40 of the mold B. The machine is then cycled a sufficient number of times to prepare a plasticized charge of material in the plasticizing cylinder at the lower end thereof preparatory to its injection into the mold cavity. The machine is then ready to be put into operation once again.

It will be understood that our invention has been shown and described with reference to a preferred embodiment thereof which is intended for the purpose of illustration rather than limitation and that variations and modifications will be apparent to those skilled in the art within the intended spirit and scope of our teaching, wherefor we do not want our patent to be limited to the form or forms of apparatus herein specifically illustrated and described nor in any manner inconsistent with the progress by which the art has been promoted by our invention

We claim:

1. Apparatus for injection molding of plastics comprising a frame, a mold fixed relative to said frame and having a face with a sprue formed therein, a plasticizing and injecting unit mounted in said frame for pivotal movement about a horizontal axis parallel to said sprue face and spaced above said mold, said unit having a nozzle spaced below said axis and adapted to swing with said unit between an operating position in engagement with said sprue face and a retracted position substantially spaced away from said sprue face, and means for fastening said unit to said frame when said nozzle is in operating position.

2. Apparatus as defined in claim 1 wherein said plasticizing and injecting unit is supported on a trunnion bar, the trunnions at the opposite ends of said bar being journaled in said frame.

3. Apparatus as defined in claim 1 wherein said nozzle when in said operating position is movable linearly parallel said sprue face between a position wherein the nozzle port registers with said mold sprue and a position wherein said nozzle port is out of registration with said mold sprue to block the exit of plasticized material.

4. Apparatus as defined in claim 3 wherein said means for fastening said plasticizing and injecting unit to said frame comprises a yoke fastened to said frame on opposite side of said plasticizing and injecting unit an adjustable member threadedly mounted in said yoke intermediate the ends thereof and being operable to force said plasticizing and injecting unit toward said mold to press said sprue face and roller means carried by said adjustable member and engageable with said plasticizing and injecting unit to accommodate said linear movement of said nozzle.